US007689906B2

(12) United States Patent
Bax et al.

(10) Patent No.: US 7,689,906 B2
(45) Date of Patent: Mar. 30, 2010

(54) TECHNIQUE FOR EXTRACTING DATA FROM STRUCTURED DOCUMENTS

(75) Inventors: Eric T. Bax, Pasadena, CA (US); Charless C. Fowlkes, Bozeman, MT (US); Louis Cisnero, Jr., Jourdanton, TX (US)

(73) Assignee: AVAYA, Inc., Basking Ridge, NJ (US)

( * ) Notice: Subject to any disclaimer, the term of this patent is extended or adjusted under 35 U.S.C. 154(b) by 1454 days.

(21) Appl. No.: 09/728,689

(22) Filed: Dec. 1, 2000

(65) Prior Publication Data
US 2004/0205548 A1 Oct. 14, 2004

Related U.S. Application Data

(60) Provisional application No. 60/195,556, filed on Apr. 6, 2000.

(51) Int. Cl.
*G06F 17/21* (2006.01)
(52) U.S. Cl. .................. 715/237; 715/234
(58) Field of Classification Search .......... 715/500, 715/513, 517, 523, 530, 200, 234, 237, 243, 715/249, 255; 345/760
See application file for complete search history.

(56) References Cited

U.S. PATENT DOCUMENTS

| | | | | |
|---|---|---|---|---|
| 5,181,162 A | * | 1/1993 | Smith et al. | 715/530 |
| 5,768,578 A | * | 6/1998 | Kirk et al. | 707/100 |
| 5,845,304 A | * | 12/1998 | Iijima | 715/530 |
| 5,978,800 A | * | 11/1999 | Yokoyama et al. | 707/5 |
| 5,995,943 A | * | 11/1999 | Bull et al. | 705/14 |
| 6,108,677 A | * | 8/2000 | Kiuchi et al. | 707/100 |
| 6,405,199 B1 | * | 6/2002 | Carter et al. | 707/6 |
| 6,424,980 B1 | * | 7/2002 | Iizuka et al. | 715/513 |
| 6,507,855 B1 | * | 1/2003 | Stern | 715/513 |
| 6,546,133 B1 | * | 4/2003 | Temkin et al. | 382/173 |
| 6,678,694 B1 | * | 1/2004 | Zimmermann et al. | 707/102 |
| 6,725,425 B1 | * | 4/2004 | Rajan et al. | 715/513 |

FOREIGN PATENT DOCUMENTS

WO     WO 01/77900 A3     10/2001

OTHER PUBLICATIONS

J. Ambite and C. Knoblock, "Agents for Information Gathering", Sep./Oct. 1997, IEEE Expert: Intelligent Systems and Their Applications. pp. 1-3.*

N. Ashish and C. Knoblock, "Semi-automatic Wrapper Generation for Internet Information Sources", 1997, Proceedings of the Second IFCIS International Conference on Cooperative Information Systems, Kiawah Island, SC pp. 1-10.*

(Continued)

*Primary Examiner*—Stephen S Hong
*Assistant Examiner*—Gregory J Vaughn
(74) *Attorney, Agent, or Firm*—Douglas Grover

(57) ABSTRACT

The present invention discloses a technique for extracting data from a file. In accordance with the present invention, a request to extract one or more data records from the file is received. The data records within the file are identified, without using prior knowledge of a structure of the file. The data records are then extracted.

4 Claims, 2 Drawing Sheets

OTHER PUBLICATIONS

J. Hammer et al., "Extracting Semistructured Information from the Web", 1997, Workshop on Management of Semistructured Data, pp. 1-8.*

N. Ashish and C. Knoblock, "Wrapper Generation for Semi-Structured Internet Sources", 1997, Proceedings of the Workshop on Management of Semistructured Data, pp. 1-8.*

Web Page—*SmartContent Attribute Wizard*, Softface, Inc. © 2000, p. 1, www.softface.com.

Web Page—*Product Correlation*, Softface, Inc. © 2000, p. 1-2—www.softface.com.

Web Page—*Liaison Content Exchange 3.0™ An Automated Solution for Catalog Content Aggregation and Rationalization*, © Copyright 2000-2001 Liaison Technology, pp. 1-2—www.liaison.com.

Cohera Products—*Cohera Content Integration System*, © 2001 Cohera, pp. 1-2.

Web Page—*Cohera Workbench™*, © 2001 Coherea Corporation, pp. 1-3—www.cohera.com.

Web Page—*Softface—Products*, Softface, Inc. © 2000, p. 1-3, www.softface.com.

Web Page—*Softface SmartContent™ Overview*, Softface, Inc. © 2000, p. 1—www.softfce.com.

Web Page—*Upload Data*, , Step 1, Softface, Inc. © 2000, p. 1—www.softface.com.

Web Page—*View Product Description*, Step 2, Softface, Inc. © 2000, p. 1, www.softface.com.

Web Page—*Automatic Categorization and Attribute Extraction, Step 3*, Softface, Inc. © 2000, p. 1—www.softface.com.

Web Page—*Review UN/SPSC Results, Step 4*, Softface, Inc. © 2000, , p. 1—www.softface.com.

Web Page—*Softface, Inc. ©—Attribute Extraction, Step 5*, Softface, Inc. © 2000, p. 1—www.softface.com.

Web Page—*Content Enabled for e-Commerce Syndication!*, Softface, Inc. © 2000, p. 1—www.softface.com.

Web Page—*SmartContent Vocabulary Wizard*, Softface, Inc. © 2000, p. 1—www.softface.com.

IPER for PCT/US01/11325, WO, May 11, 2004.

* cited by examiner

TECHNIQUE FOR EXTRACTING DATA FROM STRUCTURED DOCUMENTS

CROSS-REFERENCE TO RELATED APPLICATIONS

This invention claims the benefit of Provisional Application Ser. No. 60/195,556, filed Apr. 6, 2000. The contents of the application are incorporated by reference.

BACKGROUND OF THE INVENTION

1. Field of the Invention

This invention relates in general to data extraction process, and, in particular, to extracting data from structured documents.

2. Description of Related Art

With the fast growing popularity of the Internet and the World Wide Web ("WWW"), there is a growing demand for a technique of extracting information from different web sites, and storing the extracted information in a standard format. For example, a computer user may be interested in gathering information from the WWW about cars, luggage, or travel destinations. The user may wish to store this information in a user-defined format that allows the user to compare the attributes of each subject.

To illustrate, assume that a user is interested in gathering information about cars from several car-related web sites. More specifically, assume that the user is interested in gathering information on individual cars, including the manufacturer, the model, the year, the color, and the price.

Traditional techniques for solving this information gathering problem are typically based on knowledge of the structure used to arrange data within each specific web site. (The structure used to arrange the data within a page is commonly referred to as the syntax of the page.) These techniques require prior determination of the syntax of each page and storage of syntax information about each page in a data storage device, such as a database.

When gathering information about a subject from a particular page, the traditional techniques identify the attributes of the subject by comparing the structure of the page with the stored structure information. When there is a match, the traditional technique returns the attribute value to the user.

These traditional techniques are limited because they can only gather attribute values from a page when they know the syntax of a page. To put it differently, the traditional techniques can only gather attribute values when the syntax of a page has been previously determined and stored. Accordingly, traditional techniques are generally incapable of gathering information from redesigned or restructured web-pages or from new web pages. The traditional technique lacks syntax information about these pages. For both the redesigned or restructured web pages and the new web pages, the traditional techniques require effort and resources to determine and store information about their syntax before gathering attribute values. Determining the syntax can be time-consuming, and a large amount of storage space may be needed to store the syntax information.

Thus, there is a need in the art for an improved technique of extracting information from any web-pages and any other structured documents.

SUMMARY OF THE INVENTION

To overcome the limitations in the prior art described above, and to overcome other limitations that will become apparent upon reading and understanding the present specification, the present invention discloses a technique for extracting data from a file.

In accordance with the present invention, a request to extract one or more data records from the file is received. The data records within the file are identified, without using prior knowledge of a structure of the file. The data records are then extracted.

BRIEF DESCRIPTION OF THE DRAWINGS

Referring now to the drawings in which like reference numbers represent corresponding parts throughout.

DETAILED DESCRIPTION

Figure 1:
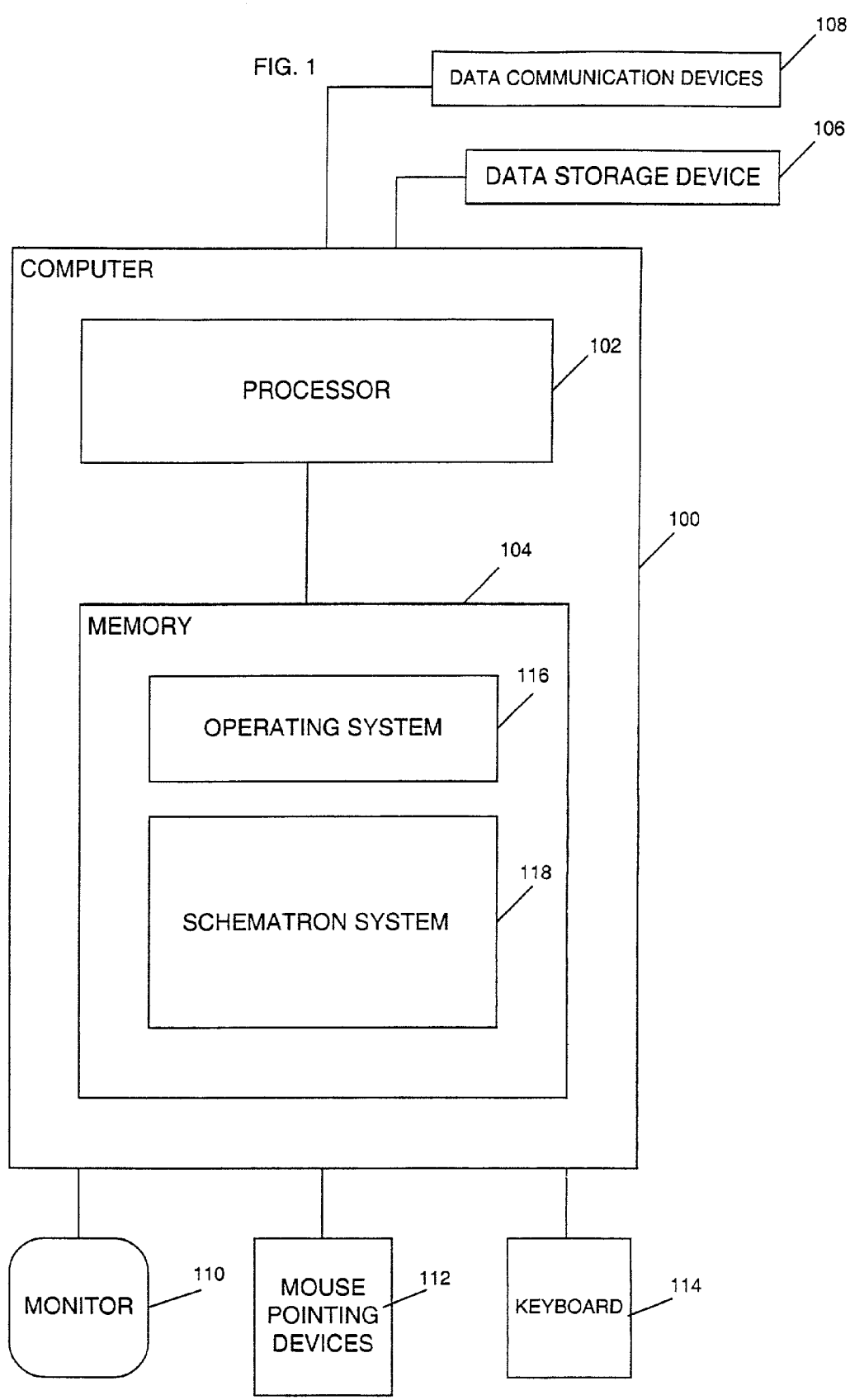
FIG. 1 schematically illustrates the hardware environment of a preferred embodiment of the present invention.

In the following description, reference is made to the accompanying drawings which form a part hereof, and in which is shown by way of illustration, a specific embodiment in which the invention may be practiced. It is to be understood that other embodiments may be utilized as structural changes may be made without departing from the scope of the present invention.

Overview

The present invention, referred to herein as the schemalyzer system, extracts data records from structured text, such as a web page or any file that contains text. Each data record contains attribute values that correspond to a single item. For example, a data record may contain the model, make, and color of a car or the size and price of a shoe.

The schemalyzer system can extract record data without prior knowledge of the structure of the text. The schemalyzer system deduces the structure of the text by using information about the attributes and knowledge of candidate structures. Both the information about the attributes and the knowledge of candidate structures are specified by the user. For the schemalyzer system implementation described herein, user-friendly programs have been developed to specify attribute information and candidate structures in the course of providing initial input to the schemalyzer system. A set of html-related candidate structures is provided with the implementation. The schemalyzer system can store the attribute information and the knowledge of candidate structures in random access memory or in a data storage device.

The information about the attributes is called ontology. The ontology includes a specified set of possible labels for each attribute and a specified set of possible values for each attribute. For example, for the subject car and the attribute maker, the attribute labels may include maker and manufacturer. The possible attribute values may include BMW and Mercedes-Benz. The attribute information may also contain synonyms for possible attribute values, such as beamer for BMW or merc for Mercedes-Benz.

The knowledge of candidate structures is encoded as specified methods to partition a region of text into a set of subregions. There are two types of candidate structures: (1) structures to locate the region of text that contains record data, and (2) structures to partition a region of text that contains record data into regions, wherein each region contains data for a single record.

In a typical data gathering scenario, the schemalyzer system receives information about where to extract the record data from. The information may include a file name, a pathname, or a pointer to an array of characters representing a web-page or other document. The schemalyzer system may receive this information from a user or from another application.

Using the received information, the schemalyzer system accesses the document and searches for text that represents labels or values of each attribute. The schemalyzer system uses locations and patterns of such text to deduce the region of record data within the document and to segment that region into regions of text that each contain data for a single record. Within each record region, for each attribute, the schemalyzer system uses the results of the search for attribute values to determine the most likely location of text representing a value for the attribute. Then the schemalyzer system extracts the attribute values in each record region to form a record for each region. As a result, a set of records is extracted from the document.

In brief, the schemalyzer system uses the knowledge that it contains about the attributes to identify the attribute labels and the attribute values within the text; to segment the text into records; and to extract attribute values for each record. Therefore, unlike conventional techniques, the schemalyzer system is not required to have prior knowledge of the syntax of the document before extracting data from the document. Instead, the schemalyzer system learns about the syntax (structure of the text) by determining the semantics (meaning of the words and symbols within the text).

Hardware

FIG. 1 is an exemplary hardware environment used to implement preferred embodiments of the invention. Embodiments of the present invention are implemented using a computer 100, which generally comprises a processor 102, random access memory (RAM) 104, data storage devices 106 (e.g., hard drive, floppy, and/or CD-ROM disc drives, etc.), data communication devices 108 (e.g., modems, network interfaces, etc.), monitor 110 (e.g., CRT, LCD display, etc.), mouse pointing devices 112, and keyboard 114. It is envisioned that, attached to the computer 100 may be other devices such as a local area network (LAN) or wide area network (WAN), a video card, bus interface, printers, etc. The computer 100 operates under the control of an operating system 116 stored in the memory to present data to the user on the monitor 110 and to accept and process commands from the user via the keyboard 114 and mouse device 112. Those skilled in the art will recognize that any combination of the above components, or any number of different components, peripherals, and other devices, may be used with the computer 100.

The present invention is preferably implemented in one or more computer programs or applications (hereinafter referred to as the schemalyzer system), which are depicted as block 118. The operating system 116 controls the execution of the schemalyzer system 118. Under the control of the operating system 116, the schemalyzer system 118 is loaded from the data storage device 106, and/or remote devices into the memory 104 of the computer for use during actual operations. Generally, the operating system 116 and the schemalyzer system 118 are tangibly embodied in and/or readable from a device, carrier, or media, and/or remote devices coupled to the computer 100 with the data communication device 108.

Those skilled in the art will recognize that the exemplary hardware environment illustrated in FIG. 1 is not intended to limit the present invention. Indeed those skilled in the art will recognize that other alternative hardware environments may be used without departing from the scope of the present invention.

Data Extraction Process

The schemalyzer system data performs the following steps. First, the text of a document (e.g., a web page or other file) is examined to determine possible sites of attribute labels and values. Based on this examination, the schemalyzer system locates a region of interest. A region of interest is defined as an area of the document that is likely to contain requested record data. Next, the schemalyzer system segments the region of interest into a sequence of record regions. Each record region is likely to contain data for a single record. Finally, the schemalyzer system extracts attribute values from each record region, forming a sequence of records.

Prior knowledge of ontology is represented in the schemalyzer system by attribute label and value recognizers, known as word scorers. Attribute labels are text that may label attribute values, (e.g., possible labels for age include "age" and "years of age.") Some word scorers contain lists of words and phrases. For example, a word scorer for the label of a price attribute may contain the words "price," "cost," and "amount." Other word scorers use algorithms to detect classes of expressions. For example, a word scorer for price attribute values may detect the following patterns in text, where the word "(number)" refers to any number: $(number), USD (number).

Prior knowledge of candidate structures is represented in the schemalyzer system by routines that take a region of text as input and return a set of subregions as output, called region partitioners. The region partitioners used to focus on the region of interest produce a set of subregions such that, for some documents, one of the subregions contains the record data. The region partitioners used to segment the region of interest into record regions produce a set of subregions such that, for some documents, each subregion contains the attribute data for a single record.

In an embodiment of the present invention, the schemalyzer system implementation reads data from html files and stores the data as records in xml files. Of course, the schemalyzer system could read data from other types of files, such as xml files, database files, spreadsheet files, or word processor files, and the schemalyzer system could store the extracted records using other formats, such as html files, database files, spreadsheet files, word processor files, or custom formats, without exceeding the scope of this invention.

Figure 2:
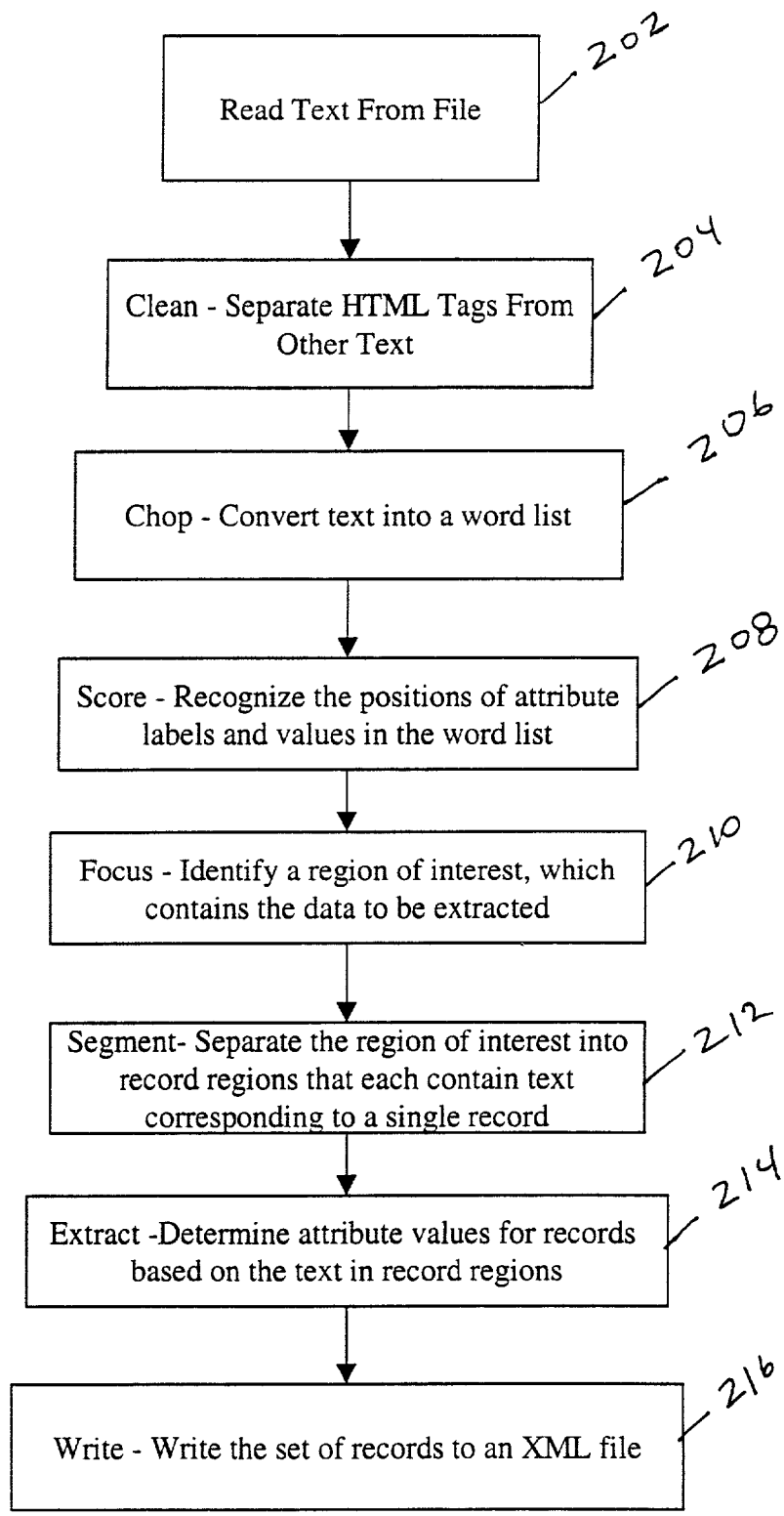
FIG. 2 is a flowchart that illustrates the steps performed by the schemalyzer system in accordance with present invention.

FIG. 2 is a flowchart illustrating the steps performed to extract data records from structured text in accordance with the present invention. Block 202 represents the schemalyzer system 118 reading text from a file that contains structured text.

The schemalyzer system then cleans the text, as represented by block 204. Cleaning involves separating tags (e.g., html tags, xml tags, etc.) from other text, so that the schemalyzer system can recognize the tags and text as separate words in subsequent steps. A tag is a command inserted into a document that specifies the manner in which the document, or portion of the document, should be formatted. Exemplary text may include: "<command>other text</command>," wherein <command> and </command> are the tags.

Separating tags from other text consists of adding a single space before each "<" character and after each ">" character. For example, the text "<td>info</td>" becomes "<td>info </td>." Also, any space after a "<" character or before a ">" character is deleted, in order to compact tags. Finally, each html space, " ," is converted into five text spaces, " ".

Block 206 represents the schemalyzer system chopping the text. Chopping involves converting the text into a word list. For example, the schemalyzer system converts the text "quiet hours\tkitten naps—" into the following word list: "quiet", "hours", "kitten", and "naps—". It is noted that the schemalyzer system interprets "naps—" as a single word. Word separators such as space, tab, and end-of-line characters are different from words, and thus, are absent from the word list. In the above example, "\t" is a tab character, and hence, "\t" is absent from the word list. Each subsequent step in this flowchart is based on the words contained in the word list.

Block 208 represents the schemalyzer system performing the scoring process. During the scoring process, the schemalyzer system recognizes the positions of attribute labels and values in the word list. For each attribute, the schemalyzer system has two word scorers—a label scorer and a value scorer.

Each word scorer is a module that receives input, such as the word list and a specified position in the word list. For each word, the scorer returns an output value that is associated with the position of that word on the word list. This output value ranges from zero to one. The output value is an estimate of the probability that the word at the specified position begins text in the word list which contains an attribute label or an attribute value.

The output value (or score) may depend on the context of the word within the word list. As an example, when analyzing the word list "for sale: Alpha Romeo," a scorer for automobile manufacturers may return the output value of one for the word "Alpha." On the other hand, when analyzing the word list "Alpha Beta Gamma," the scorer for automobile manufacturers may return the output value of zero for the word "Alpha."

To create a scorecard for the word list, the schemalyzer system provides output values for each word position in the word list. More specifically, each attribute label scorer provides an output value and each attribute value scorer provides an output value. In the scorecard, there are values corresponding to each member of the set:

{positions in word list}×{attributes}×{label,value}

Block 210 represents the schemalyzer system focusing. During the focus process, the schemalyzer system identifies a region of interest of the word list that contains text corresponding to the data to be extracted. The schemalyzer system has a list of focus region partitioners. Each focus region partitioner is a module that receives, as input, a region of the word list. The focus region partitioner returns, as output, a set of subregions. The steps of the focus process are shown below:

(1) Initially, assign the candidate region to be the region consisting of the entire word list.

(2) For each focus region partitioner:
　(a) Apply the partitioner to the candidate region to produce a set of subregions.
　(b) If there is more than one subregion in the set, then assign the partitioner the grade:

grade=(sum of all attribute label and attribute value
　　　scores in subregion with maximum of this sum)−
　　　(average over subregions of sum of all label and
　　　value scores in subregion).

(3) If no partitioner produced a set of subregions with more than one subregion, then return the candidate region as the region of interest and stop.

(4) Assign the candidate region to be the highest-scoring subregion in the set of subregions produced by the partitioner with the highest grade in the most recent step (2).

(5) Go to step (2).

The focus process is iterative so that the region of interest can be discovered even if it is nested, for example, a table within a table. It is noted that no single focus partitioner needs to be successful for all documents, since all partitioners are tried on each document, and the most successful partitioner or sequence of partitioners is used to identify the region of interest.

Block 212 represents the schemalyzer system segmenting the region of interest. Segmenting involves partitioning the region of interest into record regions that each contain text corresponding to a single record. The schemalyzer system has a list of segment region partitioners. Each segment region partitioner is a module that receives, as input, a region of the word list, and returns, as output, a set of subregions. The segment process is as follows:

(1) For each segment region partitioner:
　(a) Apply the partitioner to the region of interest to produce a set of subregions.
　(b) If there are no subregions in the set, then assign the partitioner an extremely high grade, representing infinity. (Low grades are favored in segmenting.) If there is at least one subregion in the set, then assign the partitioner a grade which is the average of the subregion grades determined by the process:
　　(i) Form an array with two entries corresponding to each attribute—a label entry and a value entry.
　　(ii) Fill in the array by summing the scores corresponding to entries over all words in the subregion.
　　(iii) The subregion grade is the sum of the squares of the differences between the entries and the value one.

(2) Return as the set of record regions the set of subregions produced by the partitioner with the lowest grade.

As with the focus region partitioners, no single segment region partitioner needs to be successful for all documents, since all segment partitioners are tried for each document, and the most successful one is used.

Block 214 represents the schemalyzer system performing an extracting process. The extracting process involves determining attribute values for records based on the text in record regions. The schemalyzer system has an extractor for each attribute. Each extractor is a module that receives, as input, the word list and a specified position in the word list and returns, as output, a value for the corresponding attribute. The returned value may depend on context within the word list. For example, when the input is the third position, and the word list is "for sale: Alpha Romeo in good condition, . . . ", an extractor for the maker attribute of car items may return "Alpha Romeo."

An extractor is not required to return text. For example, an extractor of dollar amounts may return the numerical value −17.63 when the input is the second position and word list is "total: −$17.63." The returned value may also be a special "null" value indicating that the extractor was unsuccessful.

The schemalyzer system applies the following extraction process to each record region. For each attribute, the schemalyzer system identifies the word position in the record region with the highest value score for the attribute. When two or more word positions have the exact same value, the earliest of the highest-scoring positions is chosen.

When schemalyzer system extracts an attribute value, the attribute value is added to the record. When the schemalyzer system extracts a "null" value, the schemalyzer system records in the record that no value has been extracted for the attribute. When a value is extracted for at least one attribute, then the resulting record is included in the set of records.

Block 216 represents the schemalyzer system writing the set of records to a file, such as an xml file. The schemalyzer system has an item name and a set of attribute names. The item name indicates the type of item corresponding to each record, and the attribute names indicate attributes. For example, a schemalyzer system that extracts data from each record corresponding to a car may have item name "car" and attribute names "make", "model", "year", "color", and "price." Each record has the following format:

```
<(item name)(attribute name)="(attribute value)"
    (attribute name)="(attribute value)"/>
```

If an attribute has no value in a record, then the corresponding name/value pair is not written into the file. The file consists of a list of records (e.g., xml records), one on each line.

Schemalyzer System Data and Routines

The schemalyzer system is specified by data and routines. The data includes the item name, the attribute names, and data, such as word lists, used by routines. The routines include: label word scorers, value word scorers, extractors, focus region partitioners, and segment region partitioners.

A schemalyzer system designer can choose and configure routines that are executed by the schemalyzer system. The designer also has the option of implementing new routines and including them in the schemalyzer system.

In an embodiment of the present invention, the schemalyzer system includes the following routines:

Word Scorer Routine

The input of the word scorer routine includes a word list and a position of a word in the word list as inputs. The output of the word scorer routine includes a number from zero to one. The output is an estimate of the probability that the word at the specified position in the word list begins an attribute label or an attribute value for a particular attribute.

There a several types of word scorer routines, including a phrase word scorer, a dollar amount word scorer, and a dollar amount range word scorer. The phrase word scorer contains a list of phrases. When the words beginning at the specified position of the word list match a phrase in the phrase list, then the scorer returns an output value of one. otherwise, the scorer returns an output value of zero.

The dollar amount word scorer (referred to herein as the amount scorer) returns an output value of one when the word in the specified position begins with an expression that matches any one of the following expressions: "$(number)", "$ (number)", or "−$(number)." The word "number" corresponds to any number. The dollar amount word scorer returns an output value of one half if the specified position in the word list contains a number. Otherwise, the dollar amount word scorer returns an output value of zero.

The dollar amount range word scorer (referred to herein as the range amount scorer) contains three values: low, medium, and high. When the amount scorer returns an output value of zero, the range amount scorer returns an output value of zero. The range amount scorer returns the following: a value of zero for amounts less than low; a value that varies linearly from one tenth to one for amounts that range from low to medium; a value that varies linearly from one to one tenth for amounts from medium to high; and a value of zero for amounts greater than high.

When an expression contains a dollar sign, the amount score is returned. Otherwise, one tenth of the amount score is returned. By favoring some amounts over others, the range amount scorer can differentiate among prices within a single record, and it can differentiate among numbers when prices are not labelled by dollar signs. For example, suppose a schemalyzer system reads new car data from html documents. When the prices in the html document lack dollar signs, the dollar amount word scorer scores the year of the car as high as the price. However, a dollar amount range word scorer, containing values such as low=2000, medium=20,000, and high=200,000, scores typical new car prices higher than current years.

Extractors

The input of an extractor routine is a word list and a position of the word in the word list. The output is an attribute value or a "null" value. Two types of extractor routines are phrase extractor and dollar amount extractor.

The phrase extractor contains a list of phrases. When the words beginning at the specified position of the word list match a phrase in the list, the extractor routine returns the earliest such phrase in its list. Otherwise, the extractor returns "null".

The dollar amount extractor routine returns a numerical value that corresponds to the amount displayed in the expressions for which the dollar amount word scorer returns positive values. Otherwise, the extractor returns "null" for other expressions.

Region Partitioners

The input to region partitioner routines includes a region of the word list. The output is a set of subregions. The types of region partitioners, include the balanced tag region partitioner, the balanced prefix tag region partitioner, and the snip word region partitioner.

Balanced tag region partitioner routines are applied to partitions that use balanced "open" and "close" tags, which are treated like parentheses. If the tags are not balanced, then the routine returns the entire region as the only subregion. If the entire region is surrounded by a balanced pair of open and close tags, then the routine removes the tags and partitions the remainder of the region. Once the routine has stripped away the initial and final open-close tags, the routine uses the top-level remaining open-close tags as the basis for partitioning.

The routine partitions into regions according to top-level tags. The routine makes a subregion of any text before the first open tag; a subregion of all text from the first open tag to its balanced close tag; a subregion of any text before the next open tag; a subregion from the next open tag to its balanced close tag; and so forth.

An example of a balanced tag region partitioner with "<table>" as the open tag, with "</table>" as the close tag, and with an input region is shown in Example 1 below:

Example 1

```
<table>
before
    <table>
    <tr> <td>a</td> <td>b</td> </tr>
    <tr> <td>c</td> <td>d</td> </tr>
    </table>
between
    <table>
    <tr> <td>
        <table>
        <tr> <td>e</td> <td>f</td> </tr>
        <tr> <td>g</td> <td>h</td> </tr>
        </table>
    </td> </tr>
    <tr> <td>i</td> </tr>
```

-continued

```
      </table>
   after
</table>
```

The region partitioner routine returns the set of subregions shown in Example 2 below:

Example 2

```
(1) before
------------------------------------------------
(2)  <table>
        <tr> <td>a</td> <td>b</td> </tr>
        <tr> <td>c</td> <td>d</td> </tr>
     </table>
------------------------------------------------
(3) between
------------------------------------------------
(4)  <table>
        <tr> <td>
           <table>
              <tr> <td>e</td> <td>f</td> </tr>
              <tr> <td>g</td> <td>h</td> </tr>
           </table>
        </td> </tr>
        <tr> <td>i</td> </tr>
     </table>
------------------------------------------------
(5) after
```

The balanced prefix tag region partitioner routine is similar to the balanced tag region partitioner region. The difference between the two routines is that the balanced prefix tag region partitioner routine treats any word with the specified "open prefix" as an open tag. The balanced prefix tag routine also treats any word with the specified "close prefix" as a close tag. This treatment of prefixes is useful for html tags in which the open tag may be a single word or may be simply the first word of a tag that includes property specifications. For example, an opening table tag may have the form "<table>" or the form "<table align=left>". In the first example, the first word is "<table>". In the second example, the first word is "<table". Using "<table" as a prefix for the open tag captures both cases.

The snip word region partitioner routine partitions a region into subregions that end with the specified "snip" word or with the end of the region. An example of a snip word region partitioner with a snip word of "<li>" and with an input region is shown in Example 3 below:

Example 3

```
<ul>
   <li> Red 1960 Volvo $20000
   <li> 1962 Green Cadillac $30000
   <li> $300 1971 VW Bug White
</ul>
```

The snip word region partitioner routine returns the subregions shown in Example 4 below:

Example 4

```
(1) <ul> <li>
------------------------------------------------
(2) Red 1960 Volvo $20000 <li>
------------------------------------------------
(3) 1962 Green Cadillac $30000 <li>
------------------------------------------------
(4) $300 1971 VW Bug White </ul>
```

The snip word prefix region partitioner routine is similar to the snip word region partitioner. The difference between the two routines is that the snip word prefix region partitioner treats any word with a specified "snip prefix" as a snip word.

An example of the manner in which the schemalyzer system operates on an exemplary input file is shown below. The following example schemalyzer system extracts data in which each record corresponds to a car.

The exemplary schemalyzer is shown in Example 5 below:

Example 5 item name—car attribute list
   attribute
   name—make
   label word scorer—phrase word scorer based on a list of make labels
   value word scorer—phrase word scorer based on a list of makes
   extractor—phrase extractor based on a list of makes
   attribute
   name—model
   label word scorer phrase word scorer based on a list of model labels
   value word scorer—phrase word scorer based on a list of models
   extractor—phrase extractor based on a list of models
   attribute
   name—year
   label word scorer—phrase word scorer based on a list of year labels
   value word scorer—phrase word scorer based on a list of years
   extractor—phrase extractor based on a list of years
   attribute
   name—color
   label word scorer—phrase word scorer based on a list of color labels
   value word scorer—phrase word scorer based on a list of colors
   extractor—phrase extractor based on a list of colors
   attribute
   name—price
   label word scorer—phrase word scorer based on a list of price labels
   value word scorer—dollar amount range word scorer (low=500.0 medium=15000.0 high=100000.0)
   extractor—dollar amount extractor focuser list
    focus region partitioner—html table partitioner
    focus region partitioner—html unordered list partitioner
    focus region partitioner—html ordered list partitioner
segmenter list
    segment region partitioner—html table row partitioner
    segment region partitioner—html list item partitioner
    segment region partitioner—html definition term partitioner
    segment region partitioner—html definition partitioner
    segment region partitioner—html line break partitioner In the schemalyzer shown in Example 5, the focus region partitioners are particular examples of balanced prefix tag region partitioners. Table 1 shows the partitioners and tags.

TABLE 1

| partitioner | open prefix | close prefix |
|---|---|---|
| html table | \<table\> | \</table\> |
| html unordered list | \<ul\> | \</ul\> |
| html ordered list | \<ol\> | \</ol\> |

In the schemalyzer shown in Example 5, the segment region partitioners are particular examples of snip word prefix region partitioners. Table 2 shows the partitioners and snip prefixes

TABLE 2

| partitioner | snip prefix |
|---|---|
| html table row | \<tr |
| html list item | \<li |
| html definition term | \<dt |
| html definition | \<dd |
| html line break | \<br |

An example of the manner in which the schemalyzer system extracts data from an exemplary text file is discussed below.

Example 6 represents an exemplary text file. In Example 6, the bolded portions represent text that is discussed herein. It is noted that the portions are bolded for discussions purposes only.

Example 6

```
<html>
<head> <title>cars example document</title> </head>
<body>
<table border=1>
<tr> <td>CARS!</td> <td>CARS!</td> <td>CARS!</td> </tr>
<tr> <td>LIKE NEW</td> <td>GREAT QUALITY</td> <td>GREAT PRICES</td> </tr>
</table>
<br>
Shop with us online.
<ul>
<li> Low prices.
<li> Shop 24 × 7.
<li> No pesky salesmen!
</ul>
<table border=1>
<tr> <th>Year</th> <th>Make</th> <th>Model</th> <th>Price</th>
<th>Info</th>
</tr>
<tr> <td>1998</td> <td>Acura</td> <td>Integra</td> <td>$10000</td>
<td>Color: Blue</td> </tr>
```

-continued

```
<tr> <td>1995</td> <td>Jeep</td> <td>Cherokee</td> <td>$8500</td>
<td>Color: Green</td> </tr>
<tr> <td>1990</td> <td>Toyota</td> <td>4Runner</td> <td>7500</td>
<td>Miles: 80000</td> </tr>
</table>
<br>
Call now: 1-800-BUY-A-CAR!
</body>
</html>
```

First, the schemalyzer system reads the text file shown in Example 6. Second, the schemalyzer system cleans the text file. More specifically, the schemalyzer system uses spaces to separate the html tags from nearby text For example, "<td>1998</td>" in the original text becomes "<td> 1998 </td>" in the cleaned text. The cleaning causes "1998" to become a separate word when the schemalyzer system chops the text into words. An example of a cleaned file is shown in Example 7. In Example 7, the bolded portions of the cleaned file represent text that is discussed herein. It is noted that the portions are bolded for discussions purposes only.

Example 7

```
<html>
<head> <title> cars example document </title> </head>
<body>
<table border=1>
<tr> <td> CARS! </td> <td> CARS! </td> <td> CARS! </td> </tr>
<tr> <td> LIKE NEW </td> <td> GREAT QUALITY </td> <td>
GREAT PRICES
</td>
</tr>
</table>
<br>
Shop with us online.
<ul>
<li> Low prices.
<li> Shop 24 × 7.
<li> No pesky salesmen!
</ul>
<table border=1>
<tr> <th> Year </th> <th> Make </th> <th> Model </th> <th>
Price </th>
<th> Info </th> </tr>
<tr> <td> 1998 </td> <td> Acura </td> <td> Integra </td> <td> $10000
</td> <td> Color: Blue </td> </tr>
<tr> <td> 1995 </td> <td> Jeep </td> <td> Cherokee </td> <td> $8500
</td> <td> Color: Green </td> </tr>
<tr> <td> 1990 </td> <td> Toyota </td> <td> 4Runner </td> <td> 7500
</td> <td> Miles: 80000 </td> </tr>
</table>
<br>
Call now: 1-800-BUY-A-CAR!
</body>
</html>
```

In the third step, the schemalyzer system chops the data into words. Chopping involves converting the text into a word list. For example, the schemalyzer system converts the text "cars example document" (see Example 7) into the following word list: "cars", "example", and "document." Example 8 shows an exemplary word list.

Example 8

```
0 <html>
1 <head>
2 <title>
3 cars
4 example
5 document
6 </title>
7 </head>
8 <body>
9 <table
10 border=1>
11 <tr>
12 <td>
13 CARS!
14 </td>
15 <td>
16 CARS!
17 </td>
18 <td>
19 CARS!
20 </td>
21 </tr>
22 <tr>
23 <td>
24 LIKE
25 NEW
.
.
.
```

In the fourth step, the schemalyzer system scores the words and constructs a score card. Each score is a value between zero and one. This value is an estimate of the probability that a word, at a specified position in the word list, begins text in the word list which contains an attribute label or an attribute value. Example 9 shows an exemplary score card. In Example 9, the scores are listed in the following order: make, model, year, color, price.

In Example 9, the bolded portions represent text that is discussed herein. It is noted that the portions are bolded for discussions purposes only.

Example 9

.
.
.
Make: label -- 1.0 0.0 0.0 0.0 0.0 value -- 0.0 0.0 0.0 0.0 0.0
</th>: label -- 0.0 0.0 0.0 0.0 0.0 value -- 0.0 0.0 0.0 0.0 0.0
<th>: label -- 0.0 0.0 0.0 0.0 0.0 value -- 0.0 0.0 0.0 0.0 0.0
Model: label -- 0.0 1.0 0.0 0.0 0.0 value -- 0.0 0.0 0.0 0.0 0.0
.
.
.
1998: label -- 0.0 0.0 0.0 0.0 0.0 value -- 0.0 0.0 1.0 0.0 0.019
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
Acura: label -- 0.0 0.0 0.0 0.0 0.0 value -- 1.0 0.0 0.0 0.0 0.0
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
Integra: label -- 0.0 0.0 0.0 0.0 0.0 value -- 0.0 1.0 0.0 0.0 0.0
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
$10000: label -- 0.0 0.0 0.0 0.0 0.0 value -- 0.0 0.0 0.0 0.0 0.690
</td>: label -- 0.0 0.0 0.0 0.0 0.0 value -- 0.0 0.0 0.0 0.0 0.0

-continued

<td>: label -- 0.0 0.0 0.0 0.0 0.0 value -- 0.0 0.0 0.0 0.0 0.0
Color:: label -- 0.0 0.0 0.0 1.0 0.0 value -- 0.0 0.0 0.0 0.0 0.0
Blue: label -- 0.0 0.0 0.0 0.0 0.0 value -- 0.0 0.0 0.0 1.0 0.0
.
.
.
1990: label -- 0.0 0.0 0.0 0.0 0.0 value -- 0.0 0.0 1.0 0.0 0.019
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
Toyota: label -- 0.0 0.0 0.0 0.0 0.0 value -- 1.0 0.0 0.0 0.0 0.0
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
4Runner: label -- 0.0 0.0 0.0 0.0 0.0 value -- 0.0 1.0 0.0 0.0 0.0
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
7500: label -- 0.0 0.0 0.0 0.0 0.0 value -- 0.0 0.0 0.0 0.0 0.053
</td>: label -- 0.0 0.0 0.0 0.0 0.0 value -- 0.0 0.0 0.0 0.0 0.0
<td>: label -- 0.0 0.0 0.0 0.0 0.0 value -- 0.0 0.0 0.0 0.0 0.0
Miles:: label -- 0.0 0.0 0.0 0.0 0.0 value -- 0.0 0.0 0.0 0.0 0.0
80000: label -- 0.0 0.0 0.0 0.0 0.0 value -- 0.0 0.0 0.0 0.0 0.031

It is noted that for the Acura Integra in Example 9, the schemalyzer system recognizes the year, 1998, as a possible price. The price score for the year is 0.19. However, the actual price, $10,000, outscores the year. The price score for the actual price is 0.690. This higher price score is based on at least two conditions. First, the actual price contains a dollar sign, "$". Second, the value of the price is within the specified range of the price word scorer. As shown in Example 5, the specified range for price is: low=500.0; medium=15000.0; and high=100000.0.

A similar situation occurs for the Toyota 4Runner. However, the Toyota price of 7500 lacks a dollar sign. Other numeric values for Toyota include, the mileage, 80000, and the year, 1990. Still, the actual price score is higher than the scores for both the year and the mileage—0.053 for the actual price versus 0.019 for the year and 0.031 mileage.

In the fifth step, the schemalyzer system performs the focus process. Specifically, the schemalyzer system locates a region of interest of the word list by iteratively invoking all focus partitioners, and applying the focus partitioner with the highest grade, until all partitioners fail to produce multiple subregions. The grade is calculated using the following equation:

grade=(sum of all attribute label and attribute value scores in subregion with maximum of this sum)– (average over subregions of sum of all label and value scores in subregion).

For the word list shown in Example 8, two iterations are required. For iteration 1, the candidate region of interest is the entire region. The grades and subregion sets produced by each focus partitioner are shown in Example 10.

Example 10 html table partitioner grade: 14.743
subregions:
(1) <html><head><title>cars example document</title></head><body>
-----------------------------------------------------------------------
(2) <table border=1><tr><td>CARS!</td><td>CARS!</td><td>CARS!
</td></tr><tr><td>LIKE NEW</td><td>GREAT QUALITY</td>
<td>GREAT PRICES</td>
</tr></table>
-----------------------------------------------------------------------

-continued (3) <br>Shop with us online.<ul><li>Low prices.<li>Shop 24 × 7.<li>No pesky salesmen!</ul>
--------------------------------------------------------------------------
(4) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>
--------------------------------------------------------------------------
(5) <br>Call now: 1-800-BUY-A-CAR!</body></html>
html unordered list partitioner grade: 12.286
subregions:
(1) <html><head><title>cars example document</title></head><body><table border=1><tr><td>CARS!</td><td>CARS!</td><td>CARS!</td></tr><tr><td>LIKE NEW</td><td>GREAT QUALITY</td><td>GREAT PRICES</td></tr></table><br>Shop with us online.
--------------------------------------------------------------------------
(2) <ul><li>Low prices.<li>Shop 24 × 7.<li>No pesky salesmen!</ul>
--------------------------------------------------------------------------
(3) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table><br>Call now: 1-800-BUY-A-CAR!
</body></html>

In Example 10, the html table partitioner has the highest grade, 14.743. Accordingly, the html table partitioner is applied. The highest-scoring subregion in the resulting set is the subregion consisting of the table with data on individual cars—subregion (4)—so it becomes the candidate region. The html ordered list partitioner produces a single subregion, consisting of the entire region. The entire region is shown in Example 7. Therefore, the region is not graded.

For iteration 2, the candidate region is shown in Example 11. The grades and subregion sets produced by each focus partitioner are as follows: the html table partitioner produces a single subregion, consisting of the entire region; the html unordered list partitioner produces a single subregion, consisting of the entire region; and the html ordered list partitioner produces a single subregion, consisting of the entire region. Since each of the focus partitioners produce a single region, none of the regions are graded, and the entire region becomes the region of interest.

Example 11

Region of interest --
<table border=1><tr><th>Year</th><th>Make</th><th>Model<th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>

In the sixth step, the schemalyzer system segments the region of interest into record regions by invoking all segment partitioners and applying the one that best places data for a single record into each record region. The grades and subregion sets produced by the segment partitioners are shown in Example 12.

Example 12 html table row partitioner grade: 2.007
subregions:
(1) <table border=1><tr>
--------------------------------------------------------------------------
(2) <th>Year</th><th>Make</th><th>Model</th><th>Price</th><th>Info</th></tr><tr>
--------------------------------------------------------------------------
(3) <td>1998</td><td>Acura</td><td>Integra</td><td>$10000</td><td>Color: Blue</td></tr><tr>
--------------------------------------------------------------------------
(4) <td>1995</td><td>Jeep</td><td>Cherokee</td><td>$8500</td><td>Color: Green</td></tr><tr>
--------------------------------------------------------------------------
(5) <td>1990</td><td>Toyota</td><td>4Runner</td><td>7500</td><td>Miles: 80000</td></tr></table>
html list item partitioner grade: 38.041
subregions:
(1) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>
html definition term partitioner grade: 38.041
subregions:
(1) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>
html definition partitioner grade: 38.041
subregions:
(1) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>
html line break partitioner grade: 38.041
subregions:
(1) <table border=1><tr><th>Year</th><th>Make</th><th>Model</th><th>Price</th><th>Info</th></tr><tr><td>1998</td><td>Acura</td><td>Integra</td><td>$10000</td><td>Color: Blue</td></tr><tr><td>1995</td><td>Jeep</td><td>Cherokee</td><td>$8500</td><td>Color: Green</td></tr><tr><td>1990</td><td>Toyota</td><td>4Runner</td><td>7500</td><td>Miles: 80000</td></tr></table>

In Example 12, the html table row partitioner gets the lowest grade, 2.007. Accordingly, the html table row partitioner is applied to produce the record regions. It is noted that the other segment partitioners fail to partition the region of interest into multiple subregions.

The record regions are shown in Example 13.

Example 13

```
(1) <table border=1><tr>
------------------------------------------------------------------------
(2) <th>Year</th><th>Make</th><th>Model</th><th>Price</th><th>Info
</th></tr><tr>
------------------------------------------------------------------------
(3) <td>1998</td><td>Acura</td><td>Integra</td><td>$10000</td><td>
Color: Blue</td></tr><tr>
------------------------------------------------------------------------
(4) <td>1995</td><td>Jeep</td><td>Cherokee</td><td>$8500</td><td>
Color: Green</td></tr><tr>
------------------------------------------------------------------------
(5) <td>1990</td><td>Toyota</td><td>4Runner</td><td>7500</td><td>
Miles: 80000</td></tr></table>
```

The seventh step involves the schemalyzer system applying the attribute extractors to the highest value-scoring positions within the record regions to extract attribute values, forming records.

An example of extracted records is shown below:
Acura Integra 1998 Blue 10000.0
Jeep Cherokee 1995 Green 8500.0
Toyota 4Runner 1990 null 7500.0

These extracted records were produced from record regions, (3), (4), and (5), shown in Example 13. The record regions (1) and (2) do not yield records because all the extractors fail to extract attribute values from these regions. It is also noted that a "null" value is recorded for the color of the Toyota 4Runner, because no color is extracted from the record region.

Finally, the schemalyzer system writes the output to a file, as shown below:

```
<car make="Acura" model="Integra" year="1998" color="Blue"
price="10000.0"/>
<car make="Jeep" model="Cherokee" year="1995" color="Green"
price="8500.0"/>
<car make="Toyota" model="4Runner" year="1990" price="7500.0"/>
```

From the foregoing description, it should be apparent that the present invention provides a technique for extracting data from structured documents.

Although the invention has been described in detail with reference only to the presently preferred hardware environment, those of ordinary skill in the art will appreciate that various modifications can be made without departing from the invention. Accordingly, the invention is defined only by the following claims.

What is claimed is:

1. A method for extracting records from a structured text in a computer system, comprising:
identifying potential locations of values of record fields in the text by identifying locations in the text of items in lists of known potential values for record fields,
identifying a region of interest in the text by applying multiple candidate region partitioners, evaluating each to measure how well it isolates a region with a high density and a high amount of potential locations of values of record fields, selecting one that measures best, and applying it to produce a region of interest,
segmenting the region of interest into record regions that each contain data for a single record by applying multiple candidate segmenters, evaluating each to measure how well it segments into regions such that each region has one field value per record field and such that different regions have similar numbers of field values for each record field, selecting one that measures best, applying it to produce record regions, extracting field values from record regions by identifying most likely locations of field values for each record field in each record region, and
outputting records composed of extracted field values for record fields.

2. The method of claim 1, with the addition of:
identifying potential locations of values of record fields in the text by identifying locations in the text of patterns of potential values for record fields.

3. The method of claim 1, with the addition of:
identifying potential locations of values of record fields in the text by identifying locations in the text of numbers in ranges that are potential values for record fields.

4. An apparatus for extracting data from a file, comprising a computer and a computer program, performed by the computer, for:
identifying potential locations of values of record fields in the text by identifying locations in the text of items in lists of known potential values for record fields,
identifying a region of interest in the text by applying multiple candidate region partitioners, evaluating each to measure how well it isolates a region with a high density and a high amount of potential locations of values of record fields, selecting one that measures best, and applying it to produce a region of interest,
segmenting the region of interest into record regions that each contain data for a single record by applying multiple candidate segmenters, evaluating each to measure how well it segments into regions such that each region has one field value per record field and such that different regions have similar numbers of field values for each record field, selecting one that measures best, applying it to produce record regions,
extracting field values from record regions by identifying most likely locations of field values for each record field in each record region, and
outputting records composed of extracted field values for record fields.

* * * * *